(12) United States Patent
Cordara et al.

(10) Patent No.: US 9,161,048 B2
(45) Date of Patent: Oct. 13, 2015

(54) METHOD, APPARATUS AND SYSTEM FOR ROBUST VIDEO TRANSMISSION WITH AUXILIARY INFORMATION CHANNEL

(75) Inventors: Giovanni Cordara, Turin (IT); Marco Tagliasacchi, Milan (IT); Stefano Tubaro, Milan (IT)

(73) Assignees: Telecom Italia S.p.A., Milan (IT); Politecnico di Milano, Milan (IT)

(*) Notice: Subject to any disclaimer, the term of this patent is extended or adjusted under 35 U.S.C. 154(b) by 1862 days.

(21) Appl. No.: 12/308,882

(22) PCT Filed: Jun. 30, 2006

(86) PCT No.: PCT/EP2006/006393
§ 371 (c)(1),
(2), (4) Date: Mar. 11, 2009

(87) PCT Pub. No.: WO2008/000292
PCT Pub. Date: Jan. 3, 2008

(65) Prior Publication Data
US 2009/0268809 A1    Oct. 29, 2009

(51) Int. Cl.
*H04N 7/12* (2006.01)
*H04N 19/30* (2014.01)
*H04N 19/89* (2014.01)

(52) U.S. Cl.
CPC ............. *H04N 19/395* (2014.11); *H04N 19/89* (2014.11)

(58) Field of Classification Search
USPC ........................................ 375/240.12, 240, 1
IPC ....................................................... H04N 7/32
See application file for complete search history.

(56) References Cited

U.S. PATENT DOCUMENTS

| | | | |
|---|---|---|---|
| 7,149,251 B2* | 12/2006 | Karczewicz et al. | ..... 375/240.16 |
| 2003/0026335 A1* | 2/2003 | Thyagarajan | ............... 375/240.2 |

(Continued)

FOREIGN PATENT DOCUMENTS

WO    WO 2004/086631 A3    10/2004

OTHER PUBLICATIONS

Sullivan et al.; "Draft of Version 4 of ISO/IEC 14496-10(E)", International Organisation for Standardisation, ISO/IEC JTC1/SC29/WG11, Coding of Moving Pictures and Audio, MPEG05/N7081, ISO/IEC 14496-10:2005 (AVC $3^{rd}$ Edition), pp. i-xvi and 1-318, (2005).

(Continued)

*Primary Examiner* — Tracy Li
(74) *Attorney, Agent, or Firm* — Finnegan, Henderson, Farabow, Garrett & Dunner, L.L.P.

(57) ABSTRACT

A method of transmitting video data related to a sequence of video frames, includes: encoding the video frames according to a first predictive encoding to generate encoded video data, the encoded video data including a prediction error based on the difference between a portion of a current video frame in the sequence and a first predictor thereof based on a first preceding video frame in the sequence; generating auxiliary video data related to the portion of the current video frame; and transmitting the encoded video data and the auxiliary video data to a receiver, the encoded video data being transmitted over a first channel, and the auxiliary video data being transmitted over a second channel. The step of generating auxiliary video data includes calculating a correlation between the first predictor and a predetermined second predictor based on a second preceding video frame in the sequence, the second preceding video frame preceding in the sequence the first preceding video frame.

15 Claims, 5 Drawing Sheets

(56) References Cited

U.S. PATENT DOCUMENTS

2004/0194008 A1    9/2004   Garudadri et al.
2005/0268200 A1   12/2005   Garudadri et al.
2006/0045184 A1    3/2006   Vetro et al.

OTHER PUBLICATIONS

Ohm et al.; "Information Technology—Coding of Audio-visual Objects—Part 2: Visual", International Organization for Standardization Organization International Normalization ISO/IEC JTC 1/SC 29/WG 11, N5546, Coding of Moving Pictures and Audio, ISO/IEC 14496-2:2003 (Third Edition), pp. ii-xxii and 1-723, (2003).

Wang et al.; "Robust Video Transmission Over a Lossy Network using a Distributed Source Coded Auxiliary Channel", Picture Coding Symposium, San Francisco, CA, 6 pages, Dec. 2004.

Zhang et al.; "Optimal Intra/Inter Mode Switching for Robust Video Communication over the Internet", Proc. $33^{rd}$ Ann, Asilomar Conf. on Sig. Syst. Comp. pp. 332-336, (1999).

M. Fumagalli; "Expected Distortion of Video Decoded DCT-Coefficients in Error-Prone Environment", Costa del Rei, Sardinia, Italy, 2 pages, Sep. 2005.

M. Fumagalli; "Expected Distortion of Dct-Coefficients in Video Streaming over Unreliable Channel", Visual Content Processing and Representation Lecture Noties in Computer Science, vol. 3893, pp. 1-8, (2006).

Slepian et al.; "Noiseless Coding of Correlated Information Sources", IEEE Transactions on Information Theory, vol. IT-19, No. 4, pp. 471-480, (1973).

Wyner et al.; "The Rate-Distortion Function for Source Coding with Side Information at the Decoder", IEEE Transactions on Information Theory, vol. IT-22, No. 1., pp. 1-10, (1976).

Aaron et al., "Towards Practical Wyner-Ziv Coding of Video", Proceedings 2003 International Conference on Image Processing, vol. 2 of 3, pp. 869-872, (2003).

Majumdar et al.; "Robust Distributed Video Compression Based on Multilevel Coset Codes", Conference Record of the $37^{th}$ Asilomar Conference on Signals, Systems, & Computers, vol. 1 of 2, pp. 845-849, 2003.

Majumdar et al.; "Drift Reduction in Predictive Video Transmission using a Distributed Source Coded Side-Channel", ACM Multimedia, Proceedings of the International Conference, pp. 404-407, (2004).

* cited by examiner

METHOD, APPARATUS AND SYSTEM FOR ROBUST VIDEO TRANSMISSION WITH AUXILIARY INFORMATION CHANNEL

CROSS REFERENCE TO RELATED APPLICATION

This application is a national phase application based on PCT/EP2006/006393, filed Jun. 30, 2006.

BACKGROUND OF THE INVENTION

1. Field of the Invention

The present invention relates generally to the field of digital signal processing, particularly video processing, and even more particularly to video coding/decoding for transmission over a data communications/telecommunications network. More specifically, the invention relates to methods and systems for increasing the robustness of a video transmission over lossy communications channels.

2. Description of the Related Art

The amount of information involved in a video sequence is so large that compression is required to efficiently transmit the video sequence over a data communications/telecommunications network.

Video compression is accomplished by properly coding the captured video sequence.

Various standards or specifications for video processing have been developed over the years to standardize and facilitate various coding schemes relating to multimedia signal processing.

In particular, the Moving Pictures Expert Group (MPEG) developed a standard, known as the ISO/IEC 14496-2 (Part 2—Visual) "Coding of audio-visual objects", shortly referred to as the MPEG-4 standard, and ISO/IEC 14496-10 (Part 10, Advanced Video Coding), which standardize various coding schemes for visual objects or video signals (the acronym ISO stands for International Organization for Standardization, whereas IEC stands for International Electrotechnical Commission, respectively). Generally, the MPEG specification standardizes the type of information that an encoder needs to produce and write to an MPEG-compliant bit-stream, as well as the way in which a decoder needs to parse, decompress and re-synthesize this information to re-obtain the encoded signals.

Other coding standards include, for example, the so called H.26x (promulgated by the ITU-T Video Coding Experts Group—VCEG; the acronym ITU-T stands for International Telecommunications Union, Standardization Sector).

The MPEG4 and the H.26x standards belong to the class of the so-called "predictive" video coding schemes. Generally, in a predictive video coding scheme the difference between the value (e.g., the luminance) of a generic pixel of the current video frame and a predicted value of that pixel is coded and transmitted to the receiver; the encoded difference is decoded at the receiver side, and the value obtained is added to the predicted value of the pixel, so as to obtain a reconstructed pixel value. The prediction is based on previously transmitted and decoded spatial and/or temporal information; for example, the predictors can include pixels from the present frame ("intra" prediction) as well as pixels from previously decoded frames in the video sequence ("inter" prediction); the inter prediction is motion-compensated, taking into account frame-to-frame displacement of moving objects in the sequence.

Predictive coders/decoders ("codecs") are intrinsically very susceptible to prediction mismatch between the encoder, where the source video data are encoded and then transmitted, and the decoder, where the encoded video data are received and decoded to reconstruct the original video data. The encoded video data are transmitted in packets; during the transmission, packets may get lost, due for example to the fact that the transmission channel is noisy (i.e., it is a "lossy" channel). If this occurs, a locally decoded copy of a reconstructed video frame at the encoder may not match the corresponding reconstructed video frame at the decoder. This effect is known as "drift", and leads to a significant reduction in the quality of the decoded video data. Drift occurs because, due to the noise of the transmission channel, the encoder and the decoder loose synchronization, as they work on different copies of the reconstructed video frame.

In J. Wang et al., "Robust video transmission over a lossy network using a distributed source coded auxiliary channel", Picture Coding Symposium, San Francisco (Calif.), December 2004, and US-A-2005/0268200, a method is disclosed to improve robustness of predictive video codecs, which is inspired to the principles of Distributed Source Coding (DSC). Errors in data reconstruction are reduced, and the drift effect mitigated, by sending extra information over a lower-rate auxiliary channel (or secondary channel).

The Applicant has observed that the method disclosed in the cited references uses a modification of an algorithm known in the art as the ROPE (Recursive Optimal Per-pixel Estimate) algorithm; such an algorithm is for example described in Zhang et al., "Optimal intra/inter mode switching for robust video communication over the Internet", Proc. 33rd Ann. Asilomar Conf. on Sig. Syst. Comp., 1999. The encoder estimates, on a pixel basis, the expected distortion of the decoded video sequence due to channel loss. The algorithm requires in input an estimate of the packet loss rate and the knowledge of the error concealment technique used at the decoder, with no need to perform any comparison between the original and the decoded video frames. The algorithm is applied directly in the DCT (Discrete Cosine Transform) domain: the recursive algorithm keeps track of the variance of each DCT coefficient, treated as a random variable, which can be seen as an estimate of the drift observed at the decoder.

SUMMARY OF THE INVENTION

The Applicant has observed that the method disclosed in the above references is affected by some drawbacks.

Firstly, the complexity of the encoder is greatly increased, because it is necessary to recursively update the statistics of each DCT coefficient.

Secondly, the method is not easily extensible to increasing motion estimation accuracies; in particular, the Applicant believes that while the ROPE algorithm could be extended to work with half-pixel accuracy (but this further increases the encoder complexity), the extension to ¼-pixel motion estimation accuracy is not at all trivial, and in any case it would sensibly increase the computational complexity.

Thirdly, applying the ROPE algorithm (or similar) in the DCT domain, instead of in the pixel domain, causes the correlation noise to be most of the times highly over-estimated.

The problems related to the last aspect may be somehow mitigated by adopting the technique disclosed in M. Fumagalli et al., "Expected distortion of video decoded DCT-coefficients in error-prone environment", Costa del Rei, Sardinia, Italy, September 2005: the algorithm proposed therein works in the pixel domain (as the original version of the ROPE algorithm), and converts the drift error from the pixel to the DCT domain at each frame.

Nonetheless, the first two aspects listed above remain a significant drawback for the adoption of the method in current and future applications. Another drawback is the necessity of providing to the algorithm, as an input, the estimate of the packet loss rate: this requires a preliminary characterization of the transmission channel, which may be difficult or even impractical, especially in those cases where it is not known a priori the nature of the telecommunications network used to distribute the video data.

In view of the state of the art outlined in the foregoing, the Applicant has tackled the problem of providing a method not affected by the discussed drawbacks.

The Applicant has found that the computational complexity can be greatly reduced if, instead of having the encoder estimating, on a pixel basis, the expected distortion of the decoded video sequence due to channel loss, a fixed, predetermined, worst-case value for the distortion is taken. For each current frame of a sequence of frames, this worst-case value is related to the difference between a first predictor and a second predictor, the first predictor being derived from a first frame that precedes the current frame and the second predictor being derived from a second frame that precedes the first frame.

According to an aspect of the present invention, a method is provided for transmitting video data related to a sequence of video frames.

The method comprises:
encoding a current video frame in the sequence according to a first predictive encoding to generate encoded video data, the encoded video data comprising a prediction error based on the difference between a portion of the current video frame and a first predictor of said portion of the current video frame, the first predictor being derived from a first preceding video frame in said sequence;
generating auxiliary video data related to said portion of the current video frame;
transmitting the encoded video data to a receiver over a first channel; and
transmitting the auxiliary video data to the receiver over a second channel, wherein generating auxiliary video data includes:
calculating a correlation between the first predictor and a predetermined second predictor, the second predictor being derived from a second preceding video frame that precedes the first preceding video frame in said sequence.

Preferably, generating auxiliary video data includes:
quantizing the current video frame to generate a set of quantized codewords;
grouping said codewords into a number of groups depending on said correlation;
associating an index to each of said groups; and
transmitting the auxiliary video data includes transmitting the index of one of said groups of codewords.

The number of said groups of codewords may be determined according to the following formula:

$$l = \left\lceil \log_2\left(\alpha\frac{W}{\delta}\right) \right\rceil + 1,$$

wherein W denotes said correlation, α is a weighting factor adapted to tune a strength of the second channel, δ is the distance between two generic adjacent codewords in said set, and the symbol "⌈ ⌉" denotes the operation of rounding towards the nearest integer.

The parameter α is preferably comprised between 0 and 1, more preferably comprised between 0.8 and 1.

According to a second aspect of the present invention, a system for transmitting video data related to a sequence of video frames is provided, comprising:
a transmitter including:
 a predictive encoder adapted to receive a current video frame of said sequence, and to encode the current video frame according to a first predictive encoding to generate encoded video data, wherein the encoded video data comprises a prediction error based on the difference between a portion of the current video frame and a first predictor of said portion of the current video frame, the first predictor being derived from a first preceding video frame in said sequence;
 an auxiliary encoder adapted to receive the current video frame, and to generate auxiliary video data related to said portion of the current video frame;
a first channel for transmitting the encoded video data;
a second channel for transmitting the auxiliary video data; and
a receiver adapted to receive the encoded video data and the auxiliary video data transmitted on said first and second channels, the receiver including:
 a predictive decoder adapted to receive and decode the encoded video data transmitted on the first channel and to perform a predictive decoding to obtain first decoded video data, and
 an auxiliary decoder adapted to receive the first decoded video data and the auxiliary video data, and to combine them to obtain second decoded video data,
wherein said auxiliary encoder is adapted to calculate a correlation between the first predictor and a predetermined second predictor, the second predictor being derived from a second preceding video frame that precedes the first preceding video frame in said sequence.

Preferably, the auxiliary encoder is adapted to:
quantizing the current video frame to generate a set of quantized codewords;
grouping said codewords into a number of groups depending on said correlation;
associating an index to each of said groups, and
determining an index of one of said groups in respect to the current video frame, the determined index being included in the auxiliary data.

The auxiliary encoder may be configured to determine the number of said groups of codewords according to the following formula:

$$l = \left\lceil \log_2\left(\alpha\frac{W}{\delta}\right) \right\rceil + 1,$$

wherein W denotes said correlation, α is a weighting factor, δ is the distance between two generic adjacent codewords in said set, and the symbol "⌈ ⌉" denotes the operation of rounding towards the nearest integer.

The parameter α is preferably comprised between 0 and 1, more preferably comprised between 0.8 and 1.

According to a third embodiment of the present invention, a transmitter is provided for transmitting video data related to a sequence of video frames, comprising:

a predictive encoder adapted to receive a current video frame of said sequence, and to encode the current video frame according to a first predictive encoding to generate encoded video data, wherein the encoded video data comprises a prediction error based on the difference between a portion of the current video frame and a first predictor of said portion of the current video frame, the first predictor being derived from a first preceding video frame in said sequence;

an auxiliary encoder adapted to receive the current video frame, and to generate auxiliary video data related to said portion of the current video frame;

wherein said auxiliary encoder is adapted to calculate a correlation between the first predictor and a predetermined second predictor, the second predictor being derived from a second preceding video frame that precedes the first preceding video frame in said sequence.

Preferably, the auxiliary encoder is adapted to:

quantizing the current video frame to generate a set of quantized codewords;

grouping said codewords into a number of groups depending on said correlation;

associating an index to each of said groups, and determining an index of one of said groups in respect to the current video frame, the determined index being included in the auxiliary data.

The auxiliary encoder may be configured to determine the number of said groups of codewords according to the following formula:

$$l = \left\lceil \log_2\left(\alpha \frac{W}{\delta}\right) \right\rceil + 1,$$

wherein W denotes said correlation, $\alpha$ is a weighting factor, $\delta$ is the distance between two generic adjacent codewords in said set, and the symbol "$\lceil\ \rceil$" denotes the operation of rounding towards the nearest integer.

The parameter $\alpha$ is preferably comprised between 0 and 1, more preferably comprised between 0.8 and 1.

BRIEF DESCRIPTION OF THE DRAWINGS

The features and advantages of the present invention will be made clear by the following detailed description of a preferred embodiment thereof, provided merely by way of non-limitative example, description that will be conducted making reference to the annexed drawings, wherein.

DETAILED DESCRIPTION OF THE PREFERRED EMBODIMENT

Figure 1:
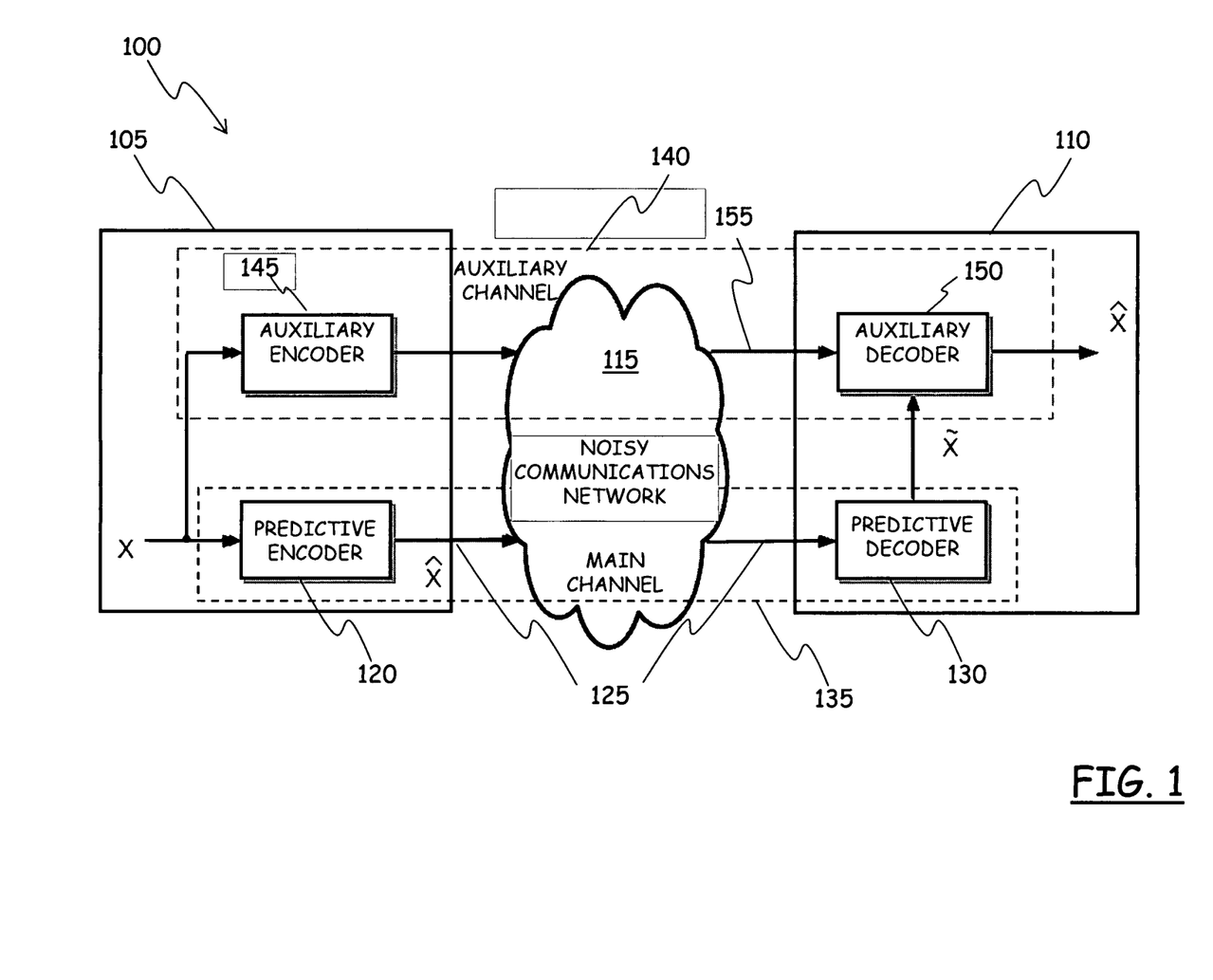
FIG. 1 schematically shows an exemplary scenario wherein the present invention is advantageously applicable, with a transmitter transmitting a video sequence to a receiver.

Referring to the drawings, FIG. 1 schematically shows part of a telecommunication system 100, defining the scenario wherein the present invention is advantageously exploited.

In particular, the scenario considered by way of example is one in which a transmitter 105 transmits an encoded video sequence to a receiver 110 over a data communications/telecommunications network 115. For example, the transmitter 105 and the receiver 110 may be fixed or mobile video-communication terminals, like mobile phones, particularly 3G (third-generation) mobile phones like GPRS (General Packet Radio System), EDGE (Enhanced Data rate for GSM Evolution) or UMTS (Universal Mobile Telecommunications Standard) phones, video-phones adapted to video-telephony over POTS (Plain Old Telephone System) networks, smart phones, PDAs (Personal Digital Assistants), personal computers, or portable computers. The data communications/telecommunications network 115 may be or include a wired or wireless communications network, particularly a mobile telephony network like a GPRS or UMTS network, or a WiFi (Wireless Fidelity) network. These lists are only exemplary and are not exhaustive and limitative for the present invention.

At the transmitter 105 side, a predictive video encoder 120, e.g. an MPEG-4 or an H.26x encoder, is configured to receive, e.g. from a video capturing device like a video-camera, a source video sequence, denoted X in the drawing, and to encode it to obtain an encoded source video sequence, denoted $\hat{X}$. The encoded source video sequence $\hat{X}$ is transmitted, over a logic lossy communications channel 125 of the network 115, to the receiver 110. At the receiver 110 side, a predictive decoder 130 is configured to receive and decode the encoded video sequence, and to reconstruct a video sequence $\tilde{X}$ which is a representation of the video sequence X received as input at the encoder 120. If the communication channel is "clean", $\tilde{X}$ is substantially equal to $\hat{X}$.

The predictive encoder 120, the logic communications channel 125 and the predictive decoder 130 form a main video sequence transmission channel 135.

As known in the art, a video sequence is made up of a sequence of frames. In a predictive video encoding scheme, considering the generic pixel of a current video frame, a predicted value (e.g., of luminance) of that pixel is determined, and the difference between the actual pixel value of the current video frame and the predicted value thereof is encoded and transmitted to the receiver (together with the motion vector, introduced herein after); the encoded difference is decoded at the receiver side, and the decoded difference value thus obtained is added to the predicted value of the pixel (calculated at the receiver), so as to obtain a reconstructed pixel value. The prediction of the pixel value is based on previously transmitted spatial and/or temporal information; for example, the predictors can include pixels from the present frame ("intra" prediction) as well as pixels from previously decoded frames in the video sequence ("inter" prediction); the inter prediction is motion-compensated, taking into account frame-to-frame displacement of moving objects in the sequence.

Frames of a video sequence to be encoded are typically not processed pixel-by-pixel, but rather divided into and processed by image blocks (also referred to as "macroblocks"); an image block is a group of pixels, e.g. a square matrix of 16×16 or 8×8 pixels.

Thus, as used in the present description, reference numeral X may as well denote the generic block of a frame to be encoded, $\hat{X}$ may denote the encoded block, and $\tilde{X}$ may denote the same block reconstructed by the predictive decoder 130.

The video sequence $\tilde{X}$ (e.g., the generic image block of a frame) reconstructed by the predictive decoder 130 may be affected by errors caused by the transmission over the network 115. This may be due for example to loss of transmitted packets, as discussed in the foregoing.

In order to increase robustness to errors, an auxiliary channel 140 is provided, over which a separate bit-stream is sent from the transmitter 105 to the receiver 110.

In particular, the auxiliary channel 140 operates on the basis of the principles of the Distributed Source Coding (DSC) theory: extra information in addition to the encoded source video sequence $\hat{X}$ is sent, at relatively low rate, to the receiver 110; such extra information is essentially another "description" (or "representation") of the encoded source video sequence $\hat{X}$, coded using the DSC principles. As known to those skilled in the art, the DSC theory rests on the Slepian-Wolf theorem (J. D. Slepian and J. K. Wolf, "Noiseless coding of correlated information sources," IEEE Transactions on Information Theory, vol. 19, pp. 471-480, July 1973) and the Wyner-Ziv theorem (A. D. Wyner and J. Ziv, "The rate distortion function for source coding with side information at the decoder," IEEE Transactions on Information Theory, vol. 22, pp. 1-10, January 1976); the problem dealt with by these theorems is that of source coding in the presence of side-information: an encoder needs to compress a first source when the decoder has access to a second, correlated source, not available at the encoder side (this second source forms a "side information" available at the decoder, but not at the encoder). According to the DSC theory, the two correlated sources can be encoded separately, reaching a total rate equal to the joint entropy as if the two sources were coded jointly, provided that the encoder knows the statistical correlation between the two sources. More formally, assuming that S1 and S2 are two correlated sources, and that the encoder has to compress the source S1 when only the decoder has access to the other, correlated source S2, the Wyner-Ziv theorem states that if S1=S2+G, G being a Gaussian noise process independent of S2, then the rate-distortion performance for coding S1 is the same whether or not the encoder has access to the source S2.

The DSC theory can in particular be applied to increase the robustness to errors in video transmission over noisy channels, by considering the original source video sequence X (e.g., the original video frame) and the erroneously reconstructed video sequence $\tilde{X}$ (e.g., the generic erroneously reconstructed video frame) reconstructed by the predictive decoder (e.g., the predictive decoder 130 of FIG. 1) as the two correlated sources S1 and S2 discussed above. The erroneously reconstructed frame $\tilde{X}$ obtained by the predictive decoder, serves as the side-information at the receiver side for the purpose of decoding the bit-stream received over the auxiliary channel 140.

In greater detail, the auxiliary channel 140 comprises an auxiliary encoder 145 and an auxiliary decoder 150 (at the transmitter 105 and receiver 110 sides, respectively), connected by an auxiliary logic channel 155. The auxiliary encoder 145 is configured to receive the source video sequence X and to generate an independent description of the source video sequence X using the principles of DSC. The auxiliary decoder 150 is configured to receive and decode the auxiliary bit-stream generated by the auxiliary encoder 145, to receive the erroneously reconstructed video sequence $\tilde{X}$ from the predictive decoder 130, exploiting it as a side information, and to output a final reconstruction $\hat{X}$ of the original video sequence X. The final reconstructed video sequence $\hat{X}$ is generally a better reconstruction of the original video sequence X than the video sequence $\tilde{X}$ reconstructed by the predictive decoder 130, because the auxiliary decoder 150 may be able to correct for some of the errors that occurred during transmission of the bit-streams over the network 115. The final reconstructed video sequence $\hat{X}$ may be written back to a frame buffer of the predictive decoder 130. It is pointed out that the same symbol $\hat{X}$ is used herein to denote the final reconstruction and the encoded source video sequence because it is assumed that after the correction operated by the auxiliary decoder the prediction at the receiver essentially coincides with that at the transmitter.

To generate the above-mentioned side-information, the present invention exploits quantization and coding techniques, starting from the source video sequence X. The objective of quantization is to generate a sequence of symbols representing an approximation to the transformation coefficients, each symbol being selected from a definite alphabet. The objective of coding is to generate a sequence of binary digits to represent the symbols.

As described for example in WO 2004/086631 and in the already cited paper by J. Wang et al., the Wyner-Ziv compression of a generic source S1 in the presence of side-information S2 at the decoder side, consists of a choice of a source code, i.e. of a number of codewords (wherein the generic codeword is a sequence of bits corresponding to a symbol) forming altogether a "codebook", with a fixed rate-distortion, i.e. resulting from uniform quantization. The source code is partitioned into a variable set of bins, also referred to as "cosets", the number of cosets depending on the total bit-rate and the statistical correlation between the two sources S1 and S2. Each coset is associated with a channel code "syndrome", representing an index of the coset. The decoding process encompasses determining and selecting the coset closest to the side information S2.

Figure 2A:
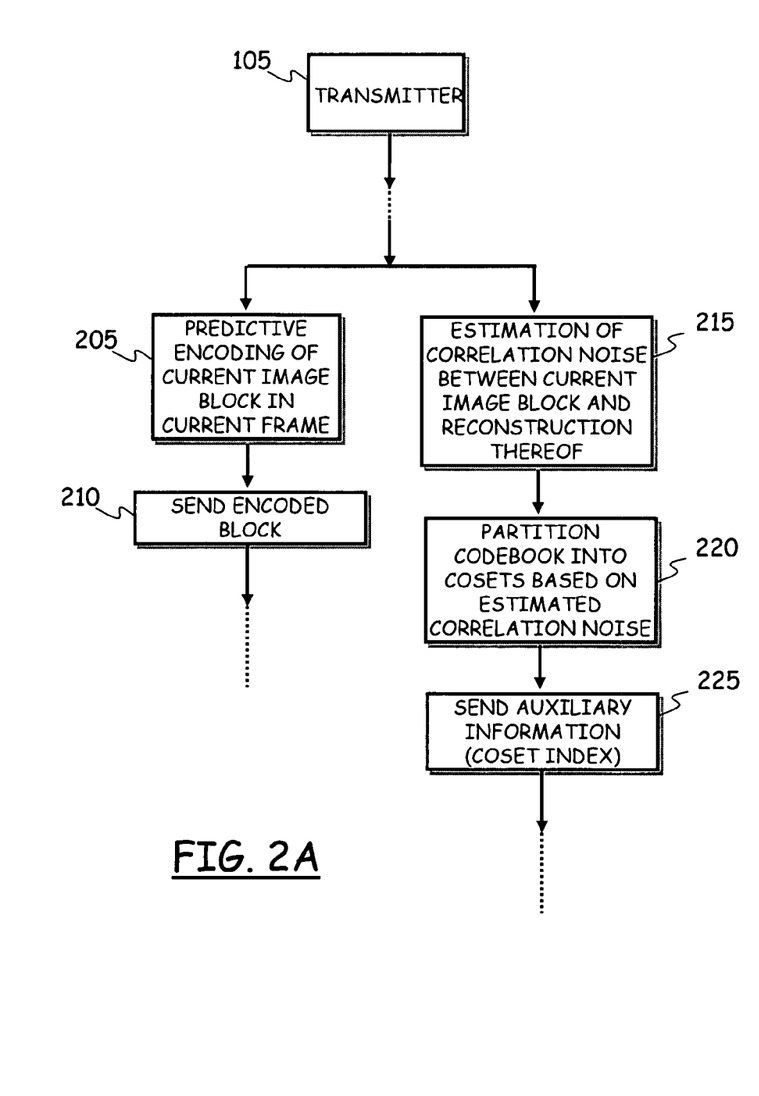
FIG. 2A is a schematic, simplified flowchart illustrating the main actions performed by an encoder system in the transmitter.
Figure 2B:
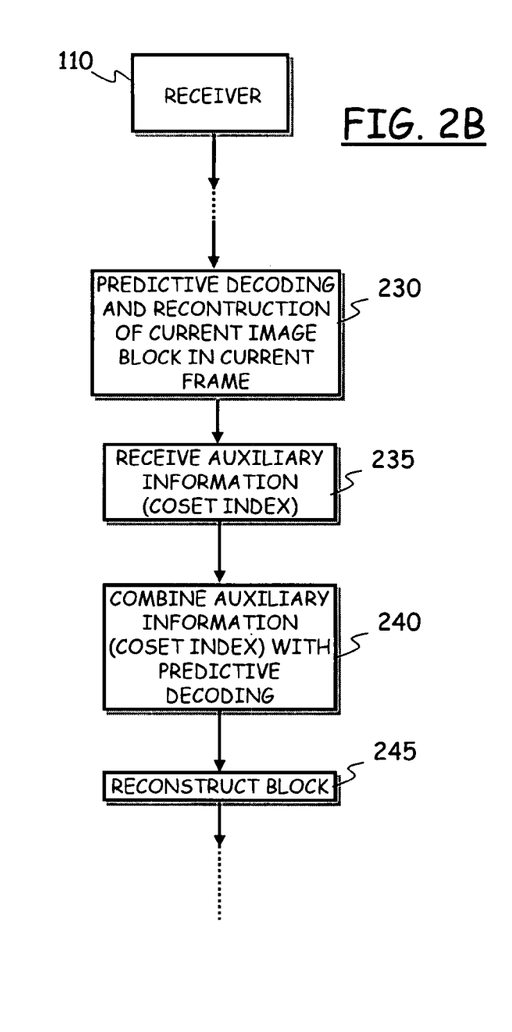
FIG. 2B is a schematic, simplified flowchart illustrating the main actions performed by a decoder system in the receiver.

According to an embodiment of the present invention, as depicted in the simplified flowchart of FIG. 2A, at the transmitter 105 side the generic block X of a currently processed frame is encoded by the predictive encoder 120 (action 205), using the selected predictive encoding algorithm, e.g. MPEG-4, and the encoded block is sent (in the form of prediction error and motion vector, as herein after described) to the receiver 110 over the logic communications channel 125 (action 210). Still at the transmitter 105 side, the block X is encoded with respect to the correlation with the side information represented by the erroneous reconstruction $\tilde{X}$ thereof generated by the predictive decoder 130 and available at the auxiliary decoder 150. In particular, the auxiliary encoder 145 determines a correlation (also referred to as "correlation noise") between the source block X and the reconstructed version $\tilde{X}$ of the block X reconstructed by the predictive decoder 130 at the receiver 110 side (action 215). Then, the auxiliary encoder 145 processes the source block X according to a DSC-based technique with respect to the estimated correlation noise. In particular, the correlation noise affects the choice of the number of cosets into which the codebook is to be divided. Thus, based on the correlation noise, the auxiliary encoder 145 partitions the codebook into the prescribed number of cosets (action 220), and then it sends the auxiliary information, represented by the coset index or syndrome, to the receiver (action 225). As depicted in the simplified flowchart of FIG. 2B, the receiver 110 receives over the logic communications channel 125 the encoded block encoded by the predictive encoder 120; the predictive decoder 130 decodes and reconstructs a generally erroneous version $\tilde{X}$ of the original block (action 230). The auxiliary decoder 150 receives the auxiliary information (coset index) over the logic communications channel 155 (action 235), and combines it with the reconstruction made by the predictive decoder 130 (action 240); in case of communication noise, i.e. of lossy transmission over the channel 125, the combination allows reconstructing a generally correct version of the original block (action 245).

In particular, according to the present invention, the correlation between the source block X and the reconstructed version $\tilde{X}$ of the block X reconstructed by the predictive decoder 130 at the receiver 110 side is determined in a computationally-efficient way, that, contrary to the method described in the cited US 2005/02682200, does not require the knowledge of the packet loss rate and the error concealment technique adopted.

Let it be assumed for the sake of simplicity that an "IPPP" Group Of Pictures (GOP) structure is adopted, in such a way that inter-predicted blocks in the frame f, at the generic time t are encoded with respect to a predictor from the preceding frame $f_{t-1}$ at the time t−1. As known to those skilled in the art, the IPPP GOP structure defines a pattern of frames wherein the letter "I" identifies a frame ("I-frame") of a video sequence that is encoded as a single image, with no reference to any past or future frames in the video sequence. The letter "P" identifies a frame ("P-frame") that is encoded relative to a past reference frame (which may be either a P-frame or an I-frame). The past reference frame is the closest-in-time preceding reference frame. Each block in a P-frame can be encoded either as an I-block or as a P-block. An I-block is encoded just like a block in an I-frame. A P-block is encoded as an area of the past reference frame as large as the block size (e.g., 16×16 pixels), plus an error term. To specify the area of the reference frame, a motion vector is included: a motion vector (0,0) means that the area to be considered is in the same position as the block being encoded. A motion vector (m,n) means that the area to be considered is shifted m pixels in the horizontal direction, and n pixels in the vertical direction compared to the block being encoded.

Let $X=f_t(x,y)$ denotes the value of the generic pixel $p_t(x,y)$ of the frame $f_1$ at the time t to be encoded, x and y being the pixel coordinates (the "pixel value" is intended to mean, for example, the pixel luminance). Also, let (dx, dy) denote the motion vector that corresponds to the best motion-compensated (deterministic) predictor $Y=\hat{f}_{t-1}(x+dx,y+dy)$ (thus, Y is the value of the pixel $p_{(t-1)}(x+dx,y+dy)$ of coordinates (x+dx, y+dy) in the frame $f_{t-1}$ at the time t−1 that is the best predictor for the pixel $p_t(x,y)$ of coordinates (x, y) in the frame $f_1$ at the time t).

According to the principles of predictive encoding, the predictive encoder 120 sends to the predictive decoder 130 (together with the motion vector) the prediction error N=X−Y (i.e., the difference between the actual pixel value and the value of the best predictor thereof).

In order to estimate the effect of drift, let the case be considered of the frame $f_{t-1}$ at the time t−1 being unavailable at the receiver 110 side, and that the frame $f_t$ at the time t is decoded by the predictive decoder 130 using the frame $f_{t-2}$ at the time t−2 as the reference frame. In fact, if the frame $f_{t-1}$ at the time t−1 is unavailable at the predictive decoder 130, or corrupted, for example due to noise, the predictive decoder 130 can use the frame $f_{t-2}$ at the time t−2 to decode the current frame.

Let Y' denote the predictor for the pixel $p_t(x,y)$ in the frame $f_t$ calculated by the auxiliary encoder 145 taking as reference frame the frame $f_{t-2}$ (under the hypothesis that the frame $f_{t-1}$ is not available), and Y" denote the erroneously decoded predictor for the pixel $p_t(x,y)$ in the frame $f_t$ calculated by the predictive decoder 130 taking as reference frame the frame $f_{t-1}$ if this is available or the frame $f_{t-2}$ if the frame $f_{t-1}$ is an available (or too "corrupted").

Let also W=Y'−Y denote the drift noise component (i.e., the difference between the best motion-compensated (deterministic) predictor of the pixel $p_t(x,y)$ under consideration and the worst-case predictor based on the frame $\hat{f}_{t-2}$).

In the case wherein Y" is computed by the predictive decoder 130 based on frame $f_{t-2}$, assuming now for the sake of simplicity that Y"=Y', the prediction error N received from the predictive encoder 120 (calculated in respect of the best predictor Y using the frame $f_{t-1}$ as the reference frame) is added to the predictor Y' so as to obtain the following noisy version $\tilde{X}$ of the value X of the pixel $p_t(x,y)$:

$$\tilde{X}=N+Y'=N+Y+W=X+W.$$

In the DSC framework, the value $X=f_t(x,y)$ corresponds to the source to be encoded, whereas the value $\tilde{X}$, i.e. the noisy reconstructed value for X due to the presence of the noise component W, is the side information available at the auxiliary decoder 150.

The noise component W is statistical in nature; according to the Wyner-Ziv theorem, once the statistics of the noise component W is known, it is possible to decode X with a probability of error that tends to zero.

In the method disclosed in the paper by J. Wang et al., "Robust video transmission over a lossy network using a distributed source coded auxiliary channel", and in US-A-2005/0268200, the ROPE algorithm is used to estimate, at the encoder, the pixel-by-pixel expected distortion of the decoded video sequence due to channel loss. As discussed in the foregoing, this greatly increases the complexity of the encoder, because it is necessary to recursively update the statistics of each pixel value, and the extension of the method to more accurate motion estimation schemes is not trivial and further increases the complexity.

According to an embodiment of the present invention, in order to achieve high computational efficiency and extensibility to any motion estimation accuracy while keeping simple the encoder, the statistics of the noise component W, instead of being estimated at the encoder, is inferred from a predetermined deterministic realization of the noise component W. In particular, in an embodiment of the present invention, the above-mentioned predetermined deterministic realization of the noise component is taken to be: W=Y'−Y, i.e., it is assumed that dropping the previous frame $f_{t-1}$ and reconstructing the current frame $f_t$ based on the frame $f_{t-2}$ preceding the dropped frame $f_{t-1}$ is a worst-case situation, and that, usually, the drift effect has a lower impact. In other words, it is assumed that if the decoder is capable of decoding the frame $f_t$ when only the decoded frame $\hat{f}_{t-2}$ is available, then the decoder will be able to decode the frame $f_t$ when a noisy reconstructed version $\hat{f}_{t-1}$ of the frame $f_{t-1}$ is available, because the latter can be obtained by performing motion compensated error concealment based on the frame $\hat{f}_{t-2}$.

Therefore, while generally the drift noise component W is a random variable, because the effect of channel noise cannot be predicted a priori, and thus, in order to apply the principles of DSC theory it would be necessary to know the statistics of the drift noise W (e.g., through estimation as described in the cited US 2005/0268200), according to an embodiment of the present invention the assumption is made that the worst-case situation corresponds to the loss of the entire preceding frame $f_{t-1}$, so that the predictive decoder 130, in order to reconstruct the current block, has to use the preceding decoded frame $\hat{f}_{t-2}$ as a reference frame. Making this assumption, the encoder may more easily calculate the correlation noise W, because for the calculation the statistical nature of W is not considered, and a worst-case situation is instead taken.

In particular, according to an embodiment of the present invention, the auxiliary encoder 145 identifies, in the frame $f_{t-2}$, a predictor for the pixel $p_t(x,y)$ of coordinates (x, y) in the frame $f_t$ at the time t. This predictor can be considered as a worst case compared to the best predictor that would be calculated using, as the reference, the frame $f_{t-1}$.

In order to identify the best predictor in the frame $f_{t-2}$ for the pixel of coordinates (x, y) in the current frame $f_t$, a possible method is to assume linear motion; in such a case, the predictor, in the frame $f_{t-2}$, of the pixel $p_t(x,y)$ of coordinates (x, y) in the frame $f_t$ is $Y' = \hat{f}_{t-2}(x+2dx, y+2dy)$.

Another possible method, involving an increased computational complexity, calls for concatenating the motion vectors; in this case, the predictor of the pixel $p_t(x,y)$ is $Y' = \hat{f}_{t-2}(x+dx+dx', y+dy+dy')$, where $(dx', dy')$ is the motion vector estimated at the pixel location $Y = \hat{f}_{t-1}(x+dx, y+dy)$.

A third possibility is to perform motion estimation between the frames $f_t$ and $\hat{f}_{t-2}$; advantageously, the search can be initialized using (2dx, 2dy) or (x+dx+dx', y+dy+dy') as starting point; this third method requires a still higher computational complexity.

Preferably, instead of working with pixel values (e.g., luminance), the encoding/decoding process is performed in the DCT domain; in this way, it is possible to tune the amount of redundancy (i.e., the amount of information transmitted over the auxiliary channel) in a selective way for each DCT coefficient. Thanks to the linearity of the DCT, the considerations made in the foregoing in respect of pixel values apply as well to the DCT domain.

Figure 3:
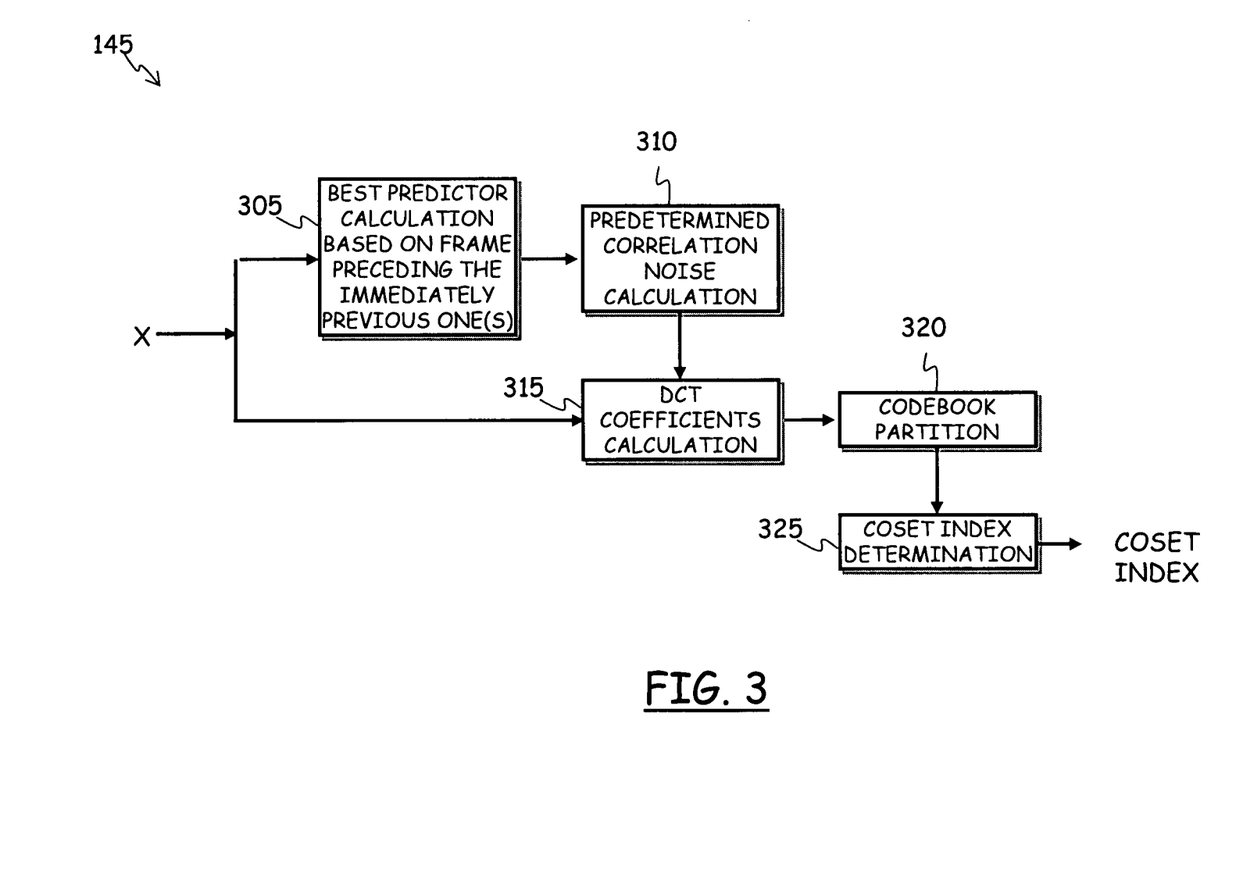
FIG. 3 pictorially shows, in terms of functional blocks, the main components of an auxiliary encoder of the transmitter.

As depicted in the schematic functional block diagram of FIG. 3, the auxiliary encoder 145 comprises a module 305 configured to receive the source video sequence X and to calculate, in respect of the generic pixel $p_t(x,y)$ in the frame $f_t$, a predictor Y' taking the frame $f_{t-2}$ as the reference frame, instead of the frame $f_{t-1}$ that is taken as the reference frame by the predictive encoder 120 in the calculation of the best predictor Y and the prediction error N for the pixel $p_t(x,y)$. In particular, albeit not limitatively, the predictor may be calculated using any one of the three methods described above.

The calculated predictor Y' is fed to a module 310 that is adapted to calculate the predetermined correlation noise, i.e. the predetermined drift term W, based on the difference W=Y'−Y.

The above operations are performed for every pixel in the current frame $f_t$.

The calculated drift terms W in respect of the pixels of the frame $f_t$ are used by a block-based DCT coefficients calculation module 315 that is adapted to evaluate the effect of the drift on each DCT coefficient. In particular, the difference between the prediction error $N_{t-1}$ calculated for the predictor based on the reference frame $f_{t-1}$ and the prediction error $N_{t-2}$ calculated for the predictor based on the reference frame $f_{t-2}$ is calculated.

A codebook partition module 320 is adapted to partition the codebook into a number of cosets depending on the calculated correlation noise.

A coset index determination module 325 is adapted to determine the coset index to be communicated to the auxiliary decoder 145 over the logic communications channel 155.

Figure 4:
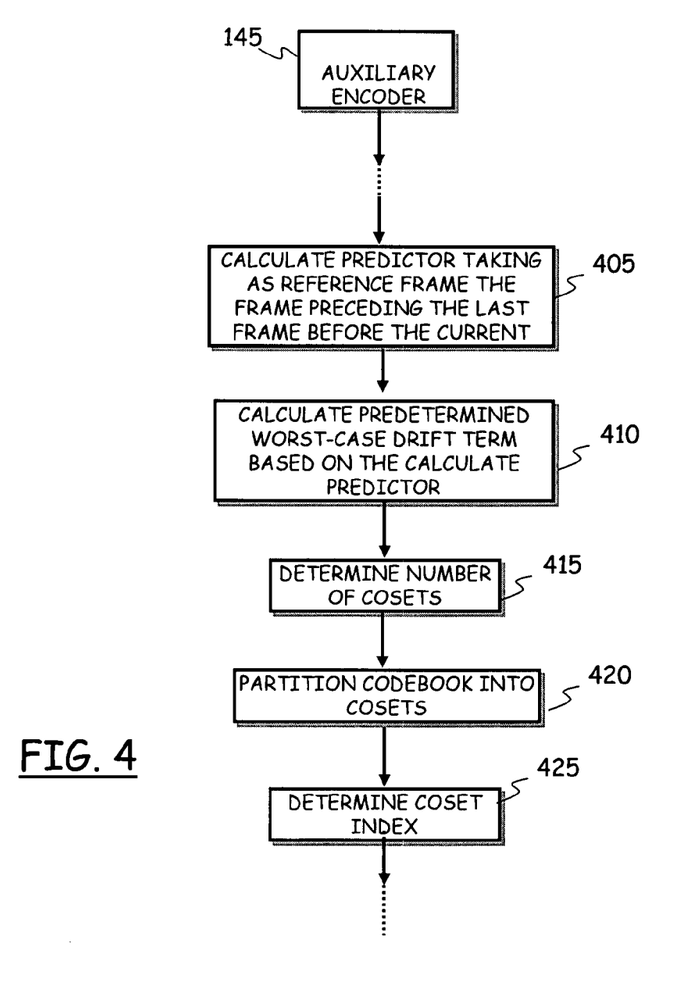
FIG. 4 is a simplified flowchart illustrating the main actions performed by the auxiliary encoder.

FIG. 4 is a summarizing flowchart of the main actions performed by the auxiliary encoder 145 for obtaining the auxiliary information to be sent to the auxiliary decoder 150. Firstly, the predictor Y' of the current pixel is calculated taking as the reference frame the frame $f_{t-2}$ (action 405); then, the drift term W is calculated based on the predictor Y' (action 410), and the number of cosets into which the codebook is to be partitioned is determined (action 415). The codebook is then partitioned into the calculated number of cosets (action 420), and the coset index is determined (action 425).

Figure 5:
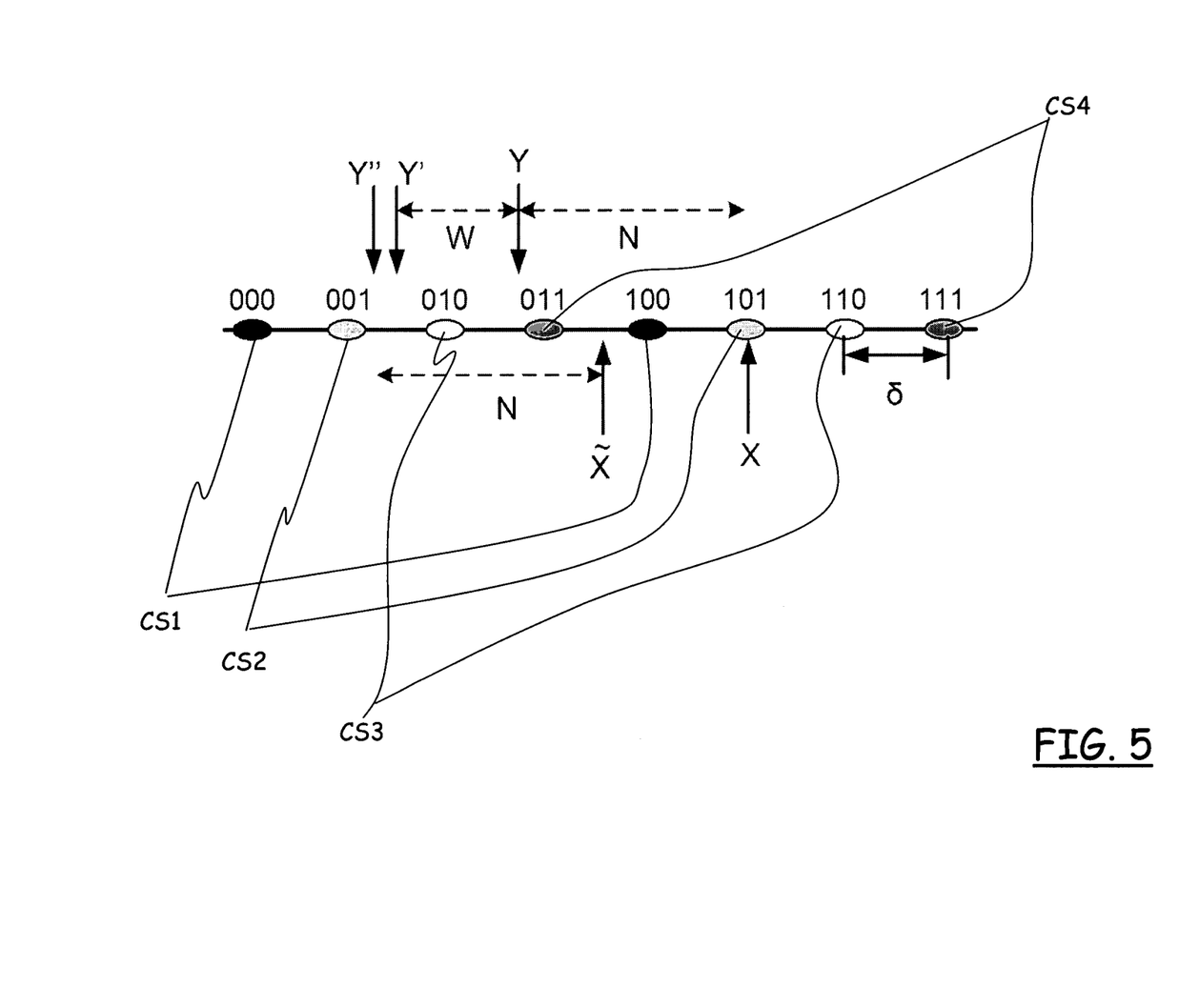
FIG. 5 pictorially shows an exemplary, simplified quantized codewords set (i.e., a codebook), and a subdivision thereof into cosets.

Referring to the simplified example depicted in FIG. 5, let X, $\tilde{X}$, Y, Y' and Y" denote DCT coefficients values, wherein:

X is the correct DCT coefficient value to be reconstructed;

Y is the best predictor calculated taking the previous frame $f_{t-1}$ as the reference frame, determined and used by the predictive encoder 120 for calculating the prediction error N;

$\tilde{X}$ is the noisy reconstructed value for X;

Y' is the predictor for the frame $f_t$ calculated by the auxiliary encoder 145 taking the frame $f_{t-2}$ as the reference frame;

Y" is the erroneously decoded predictor calculated by the predictive decoder 130 based on frame $f_{t-1}$ or on frame $f_{t-2}$ if the former is unavailable or unsuitable.

In other words, the predictive decoder 130, based on the information received from the predictive encoder 120, calculates (i.e. decodes a predictor for) the generic block of the frame $f_t$; however, the loss of information caused by the noise on the channel 125 causes the decoded predictor Y" to be in general different from the correct predictor Y (that would instead be reconstructed by the predictive decoder in case of absence of noise).

FIG. 5 shows a simple case of a codebook comprising eight values, i.e. eight codewords, namely "000", "001", "010", "011", "100", "101", "110", "111"; this corresponds to considering a three-bit quantization.

In FIG. 5 a situation is depicted wherein, at the predictive decoder 130, the best predictor Y is not available. Availability of the predictor Y at the predictive decoder 130, together with the information about the prediction error N, would allow to reconstruct the correct value X; instead, it is assumed that the predictive decoder 130 has available the predictor Y", and, based on it, the noisy reconstructed value $\tilde{X}$ is obtained; as discussed above, this corresponds to setting a predetermined, worst-case drift term W.

The auxiliary encoder 145 sends to the auxiliary decoder 150 extra information over the auxiliary logic channel 155.

To generate the extra information, the auxiliary encoder 145 performs a partition of the source codebook, i.e. the set of quantization indexes, into a number l of disjoint cosets. The number l of cosets into which the codebook is partitioned depends on the drift noise W and the quantization step size.

It is by way of example assumed that the codebook is partitioned into four cosets CS1, CS2, CS3 and CS4. The coset CS1 includes the codewords "000" and "100"; the coset CS2 includes the codewords "001" and "101"; the coset CS3 includes the codewords "010" and "110"; and the coset CS4 includes the codewords "011" and 111". Each coset may be identified by a respective index; the index of a generic coset may be formed by the two least-significant bits of the source codewords belonging to that coset; thus, the index of the coset CS1 is "00", the index of the coset CS2 is "01", the index of the coset CS3 is "10", and the index of the coset CS4 is "11". In the example considered, the codeword for X is assumed to be "101", and the coset index transmitted from the auxiliary encoder 145 to auxiliary decoder 150 will be "01". It is noticed that the values Y and Y' generally do not lie on the quantization lattice, because they represent DCT coefficients of the block chosen as a predictor in the reference frame, and thus they are in general real values.

According to an embodiment of the present invention, the number of cosets into which the codebook is partitioned is determined according to the following formula:

$$l = \left\lceil \log_2\left(\alpha \frac{W}{\delta}\right) \right\rceil + 1$$

The parameter α is a weighting factor that is used to tune the strength of the auxiliary logic channel and the parameter δ is the distance between two generic adjacent codewords. The greater the parameter α, the higher the number of allocated cosets, and the higher the robustness against noise of the method. It is underlined that other ways of calculating the number l of cosets are however possible. The value of the parameter α ranges from 0 to 1, preferably from 0.8 and 1. The symbol "⌈ ⌉" denotes the operation of rounding towards the nearest integer.

The predictive decoder 130 reconstructs the current frame based on the prediction errors N received from the predictive encoder 120 and the previously decoded frame. In general, the predictive decoder does not use as a predictor neither Y nor Y', but rather Y", depending on the actual error pattern. Due to channel loss, the reconstructed frame might be different from the original one, i.e., it is in general $\tilde{X} \neq X$. Based on the coset index received from the auxiliary encoder 145 over the auxiliary logic channel 155, the auxiliary decoder 150 is capable of decoding the original value X as the codeword, in the coset corresponding to the received index, that is closer to the reconstructed value $\tilde{X}$. Referring to the shown example, it can be appreciated that the codeword of the coset of index "01" and which is closest to the reconstructed value $\tilde{X}$ is "101", that corresponds to the original value X. It is noticed that although in general Y'≠Y" due to the transmission errors, the auxiliary decoder is able to correctly decode the block whenever the number of cosets is sufficiently large.

Thanks to the present invention, robustness of a video transmission is improved in a computationally-efficient way; contrary to the methods known in the art, the method according to the present invention can be extended to increased motion accuracy schemes, e.g. to ¼ pixel motion accuracy. It is remarkable that, despite the method according to the present invention does not cause a substantial increase in complexity of the encoder, contrary to the methods known in the art, this essentially does not impact on the performance in terms of video transmission robustness over noisy channels.

The present invention can be applied to any existing predictive video coding scheme: indeed, according to the present invention, an auxiliary independent channel, exploiting the DSC framework, is built for increasing robustness against error. Thus, backward compatibility with devices unable to adopt DSC techniques is ensured.

Also, the method according to the present invention is independent from the motion accuracy adopted.

It is also underlined that although in the foregoing an IPPP GOP structure has been assumed, this is not be construed as a limitation of the present invention: the method according to the present invention can be applied to other GOP structures, like an IBBBP GOP structure, with the letter "B" denoting "B"-frames, i.e., bidirectional frames, i.e. frames that contain only the data that have changed from the preceding frame or are different from the data in the very next frame.

In the exemplary embodiment described in the foregoing, it has been assumed that the predictive decoder does not perform any additional motion search to correct for drift. This means that a single predictor Y" is tested, which comes from the error concealed previous frame(s).

In alternative embodiments of the present invention, the decoder may be designed to test two or more candidate predictors Y" in order to be able to successfully reconstruct a pixel or, more typically, an image block. In this case, it should be determined when the decoding succeeds. One possibility is to send a low-cost signature of the block to be encoded (e.g., a CRC—Cyclic Redundant Code); when the CRC computed in respect of the decoded block matches that sent by the predictive encoder, the decoding is declared successful. Another possibility is to compare the two or more versions of the decoded block, decoded using two or more different candidate predictors, with the side information Y", and pick the decoded block that minimizes the distance (X−Y") with the side information.

The present invention has been here described making reference to an embodiment thereof; those skilled in the art will readily recognize that several modifications to the described embodiment, as well as other embodiments of the invention can be devised, without departing from the scope of protection of the invention as defined in the appended claims.

The invention claimed is:

1. A method of transmitting video data related to a sequence of video frames, comprising:
   encoding a current video frame in said sequence according to a first predictive encoding to generate encoded video data, the encoded video data comprising a prediction error based on a difference between a portion of the current video frame and a first predictor of said portion of the current video frame, the first predictor being derived from a first preceding video frame in said sequence;
   generating auxiliary video data related to said portion of the current video frame, said generating auxiliary video data comprising calculating a correlation between the first predictor and a predetermined second predictor, the second predictor being derived from a second preceding video frame that precedes the first preceding video frame in said sequence;
   transmitting the encoded video data to a receiver over a first channel; and
   transmitting the auxiliary video data to the receiver over a second channel.

2. The method of claim 1, wherein generating auxiliary video data comprises:
   quantizing the current video frame to generate a set of quantized codewords;
   grouping said codewords into a number of groups depending on said correlation;
   associating an index with each of said groups; and
   wherein transmitting the auxiliary video data comprises transmitting the index of one of said groups of codewords.

3. The method of claim 2, wherein the number of said groups of codewords is determined according to the following formula:

$$l = \left\lceil \log_2\left(\alpha \frac{W}{\delta}\right) \right\rceil + 1,$$

wherein W denotes said correlation, α is a weighing factor, δ is a distance between two generic adjacent codewords in said set, and a symbol "⌈ ⌉" denotes the operation of rounding to a nearest integer.

4. The method of claim 3, wherein α is between 0 and 1.

5. The method of claim 4, wherein α is between 0.8 and 1.

6. A system for transmitting video data related to a sequence of video frames, comprising:
   a transmitter comprising:
      a predictive encoder capable of being adapted to receive a current video frame of said sequence and to encode the current video frame according to a first predictive encoding to generate encoded video data, wherein the encoded video data comprises a prediction error based on the difference between a portion of the current video frame and a first predictor of said portion of the current video frame, the first predictor being derived from a first preceding video frame in said sequence;

an auxiliary encoder capable of being adapted to receive the current video frame, and to generate auxiliary video data related to said portion of the current video frame, said auxiliary encoder capable of being adapted to calculate a correlation between the first predictor and a predetermined second predictor, the second predictor being derived from a second predictor, the second predictor being derived from a second preceding video frame that precedes the first preceding video frame in said sequence;

a first channel for transmitting the encoded video data;

a second channel for transmitting the auxiliary video data; and a receiver adapted to receive the encoded video data and the auxiliary video data transmitted on said first and second channels, the receiver comprising:

a predictive decoder adapted to receive and decode the encoded video data transmitted on the first channel and to perform a predictive decoding to obtain first decoded video data; and an auxiliary decoder adapted to receive first decoded video data and auxiliary video data, and to combine the first decoded video data and auxiliary data to obtain second decoded video data.

7. The system of claim 6, wherein said auxiliary encoder is capable of being adapted to:

quantize the current video frame to generate a set of quantized codewords;

group said codewords into a number of groups depending on said correlation;

associate an index with each of said groups; and determine an index of one of said groups in respect to the current video frame, the determined index comprising the auxiliary data.

8. The system of claim 7, wherein the auxiliary encoder is adapted to determine the number of said groups of codewords according to the following formula:

$$l = \left\lceil \log_2\left(\alpha\frac{W}{\delta}\right) \right\rceil + 1,$$

wherein W denotes said correlation, $\alpha$ is a weighing factor, $\delta$ is a distance between two generic adjacent codewords in said set, and a symbol "⌈ ⌉" denotes the operation of rounding to a nearest integer.

9. The system of claim 8, wherein $\alpha$ is between 0 and 1.

10. The system of claim 9, wherein $\alpha$ is between 0.8 and 1.

11. A transmitter of video data related to a sequence of video frames, comprising:

a predictive encoder capable of being adapted to receive a current video frame of said sequence, and to encode the current video frame according to a first predictive encoding to generate encoded video data, wherein the encoded video data comprises a prediction error based on the difference between a portion of the current video frame and a first predictor of said portion of the current video frame, the first predictor being derived from a first preceding video frame in said sequence; and an auxiliary encoder adapted to receive the current video frame, and to generate auxiliary video data related to said portion of the current video frame, said auxiliary encoder capable of being adapted to calculate a correlation between the first predictor and a predetermined second predictor, the second predictor being derived from a second preceding video frame that precedes the first preceding video frame in said sequence.

12. The transmitter of claim 11, wherein said auxiliary encoder is capable of being adapted to:

quantize the current video frame to generate a set of quantized codewords;

group said codewords into a number of groups depending on said correlation;

associate an index to each of said groups; and determine an index of one of said groups in respect to the current video frame, the determined index comprising the auxiliary data.

13. The transmitter of claim 11, wherein the auxiliary encoder is capable of being adapted to determine the number of said groups of codewords according to the following formula:

$$l = \left\lceil \log_2\left(\alpha\frac{W}{\delta}\right) \right\rceil + 1,$$

wherein W denotes said correlation, $\alpha$ is a weighting factor, $\delta$ is a distance between two generic adjacent codewords in said set, and a symbol "⌈ ⌉" denotes the operation of rounding to the nearest integer.

14. The transmitter of claim 13, wherein $\alpha$ is between 0 and 1.

15. The transmitter of claim 13, wherein $\alpha$ is between 0.8 and 1.

* * * * *